Sept. 16, 1958
L. E. HARRISON
2,852,304
DUMPING WHEELBARROW
Filed March 15, 1954
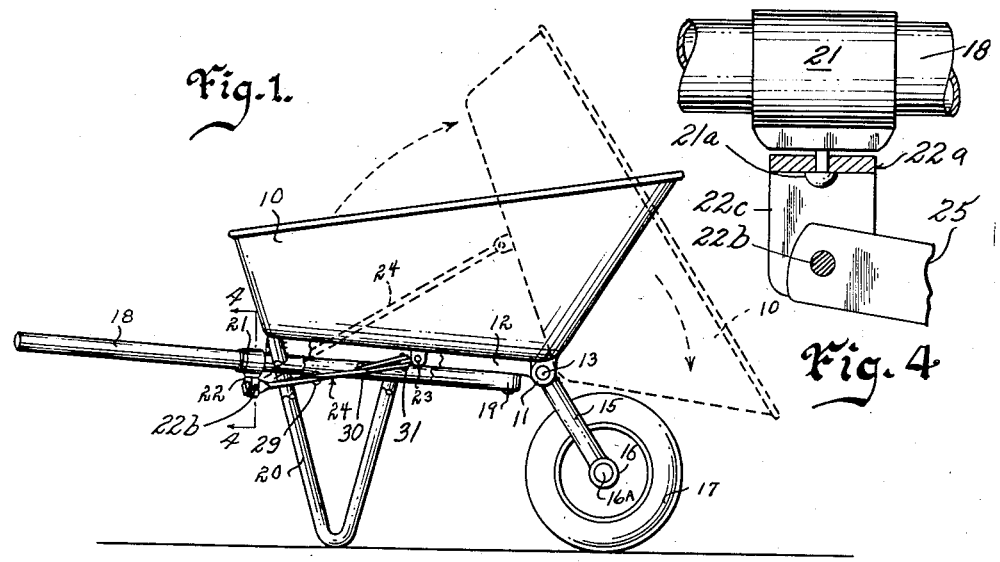
Fig. 1.
Fig. 4.
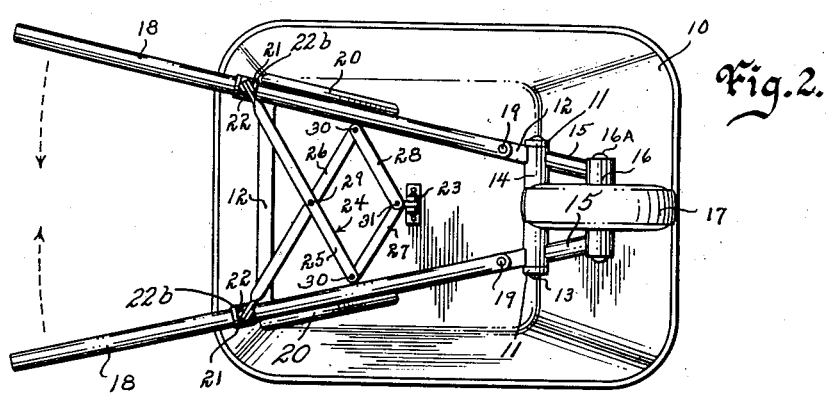
Fig. 2.
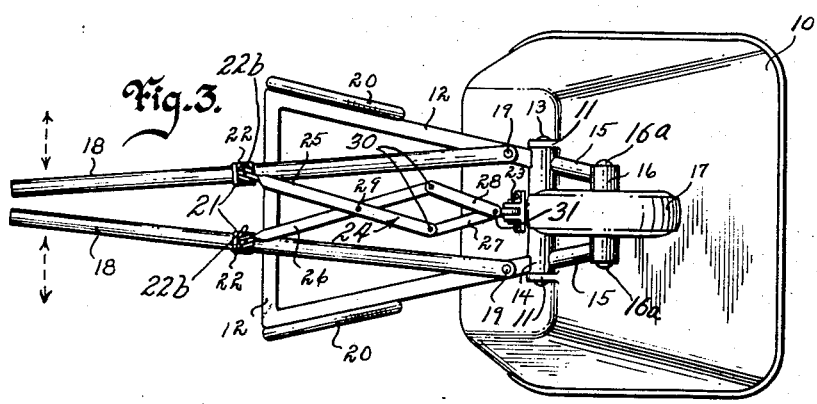
Fig. 3.
Witness
Edward P. Seeley
Inventor: Lew E. Harrison
by Talbert Dick Adler
Attorneys

United States Patent Office 2,852,304
Patented Sept. 16, 1958

2,852,304
DUMPING WHEELBARROW

Lew E. Harrison, Nashua, Iowa

Application March 15, 1954, Serial No. 416,093

3 Claims. (Cl. 298—3)

This invention relates to wheelbarrows and more particularly, means for dumping a loaded wheelbarrow.

Despite the great achievments of the modern machine age, the usefulness of the common wheelbarrow in transporting various loads over short distances has not been replaced. The wheelbarrow is used extensively in construction work to move loads of various types which are too heavy and too cumbersome to be lifted by the average man. The wheelbarrow has further proven its usefulness about the home in the yard and garden. But, in spite of the widespread use of this device, it has at least one serious limitation in that the wheelbarrow does not readily lend itself to ease in unloading by virtue of its unusual structure. The lifting of the handles to an almost vertical position is the accepted and practical way of unloading the conventional wheelbarrow as tipping the bed sidewise, or in effect, upsetting the wheelbarrow, results in an uncontrolled unloading. The laborious task of elevating the handles to a semi-vertical position necessitates an adjustment in the operator's grip upon the handles, which further complicates the operation. This unloading difficulty is even experienced when the wheel barrows are used in construction work by men accustomed to using the device. The average worker is able to move a much greater load in a wheelbarrow than he can readily empty. This limitation forces the worker to haul smaller loads so that the unloading may be easily performed. Thus, in a situation such as hauling wet concrete from the mixer to the forms, these small loads will require more wheelbarrows and men, or more time, either of which would add to the cost of building. Furthermore, any uncontrolled unloading contributes to a loss of time and material.

To my knowledge, there have been various wheelbarrows developed to cope with this unloading problem. The devices to which I have knowledge have employed various levers and brakes to perform the dumping operation, and many of these devices are of complex structure. Furthermore, all of the "self-dumping" wheelbarrows to which I have knowledge must be brought to a resting position before the dumping can be effected, or the grip on the handle by the operator must be shifted to engage a dumping lever if the wheelbarrow is not brought to its resting position. Placing the wheelbarrow in its resting position often results in an unpredicted upsetting if the dumping area is of uneven terrain. Similary, a shifting of the operator's grip while the wheel barrow is in motion results in a shift of the center of gravity of the load which also tends to cause an unexpected, uncontrolled dumping.

Therefore, the principal object of my invention is to provide a wheelbarrow with means for facilitating the unloading thereof.

A still further object of my invention is to provide a wheelbarrow with a dumping device that may be operated without placing the wheelbarrow in its resting position.

A still further object of my invention is to provide a wheelbarrow with a dumping device that may be operated without the operator releasing or shifting his grip on the handles of the wheelbarrow.

A still further object of my invention is to provide a wheelbarrow with a dumping device that is easily operated, economical in manufacture and durable in use.

These and other objects will be apparent to those skilled in the art.

My invention consists of the construction, arrangement, and combination of the various parts of the device, whereby the objects contemplated are attained as hereinafter more fully set forth, pointed out in our claims, and illustrated in the accompanying drawings, in which:

Fig. 1 is an elevation of a wheelbarrow equipped with my dumping device. The dotted lines represent the bed of the wheelbarrow in dumping position. A portion of the frame, a handle and one leg have been cut away to more clearly show the structure of the device.

Fig. 2 is a plan of the bottom of a wheelbarrow equipped with my dumping device when the bed of the wheelbarrow is in its loaded position.

Fig. 3 is a plan of the bottom of a wheelbarrow equipped with my dumping device when the bed of the wheelbarrow is in its unloading position, and Fig. 4 is a sectional view taken on line 4—4 of Fig. 1.

Referring to these drawings in detail, I have used the numeral 10 to designate the bed of the wheelbarrow. The bed is hingedly attached to the apex and forward portion of an A-shaped frame 12 by means of two eyes 11 which project downward from the bottom of said bed. Frame 12 more specifically has the shape of a trapezoid with a major base at its wide end and a minor base at its narrow end. The bed is rotatably secured by a pin or axle 13 which extends laterally from the sides of apex 14 and passes through the eyes 11. Projecting forward and downwardly from apex 14 are two supports 15 to which is secured a horizontal member 16 similar to apex 14. This member 16 houses axle 16a adjacent the outer ends of supports 15 which in turn, secures the rotatable wheel member 17. The wheel member 17 rotates in a vertical plane on axle 16a in between supporting members 15.

Two handles designated 18 are hingedly secured to the bottom side of the A-frame near its apex by means of pins 19. The handles are permitted, therefore, to rotate in the plane of the A-frame, but are limited in their lateral movement away from the center of the frame by two vertical legs 20 which are attached to the rear and side portions of the A-frame. The A-frame is in a substantially horizontal position whenever the dumping operation (to be described hereafter) is not taking place.

Attached to the two handles 18 at a point to the rear of said frame are collars 21 which have a universally jointed means 22 secured to their bottom side. Means 22 is universally jointed in that it will permit rotation and pivoting about collars 21 except for any physical interference of handles 18. A hinge 23 is secured to the bottom side of bed 10 to the rear of the point at which the bed is hingedly attached to the frame. The hinge is secured to the bed in any convenient manner such as by rivets and is positioned so that its axis is parallel to the axis of pin 13. Suspended between the hinge 23 and the universal joints 22 on collars 21 is a lazy-tongs device 24 which is composed of two longer bars or straps 25 and 26 and two shorter bars or straps 27 and 28. As shown in Fig. 4, bar 25 (or 26) is universally connected to handle 18. This universal connection is accomplished by U-shaped bracket 22a being pivoted in a horizontal plane to collar 21 by pin 21a. Bar 25 (or 26) is thereupon pivoted by pin 22b in a vertical plane between the projecting arms 22c of U-shaped bracket 22a. The two longer bars are pivotally connected to each other by pin 29 at a point away from the centers of the bars. The ends of the bars 25 and 26 furtherest from the pivoted connection are each attached to one of the two universal joints 22 on the handles 18. The ends of short bars 27 and 28 are hingedly secured by pins 30 to the longer bars 25 and 26 respectively, at the extremity of the longer bars nearest their point of intersection. Pin 31 hingedly connects the forward ends of bars 27 and 28 and also serves as a means of securing the two shorter bars 27 and 28 to the hinge 23.

When a load is being transported by my wheelbarrow, the handles 18 are in the position of an ordinary wheelbarrow as shown in Fig. 2. With the handles in this extended position, the lazy-tongs device is elongated in a lateral direction and compressed between its means of support—the universal joints 22 on one end and the hinge 23 on the other end. When the operator reaches the point at which unloading is to take place, he merely moves the handles 18 of the wheelbarrow as shown in Fig. 2 to the position of the handles in Fig. 3. It is not necessary for the operator to place the wheelbarrow in resting position or to adjust his grip upon the handles to effect the unloading. As the handles 18, and thus, the universal joints 22, converge upon each other, the lazy-tongs device is necessarily compressed in a lateral direction, which brings about a proportionate increase in the distance between the extremities. The universal joints 22, which are secured to the rear extremity of the lazy-tongs, are fixed against any yielding displacement because of the force being exerted upon the handles by the operator. However, hinge 23 which embraces the front extremity of the lazy-tongs, is free to rotate as the bed 10 tends to rotate about pin 13.

As the handles 18 converge upon each other, a leverage is transferred from the handles to the longer bars 25 and 26 of the lazy-tongs. By virtue of the off-centered pin connection 29 and the pin connection 30, the leverage is increased and further transferred from the longer bars 25 and 26 to the shorter bars 27 and 28. These bars in turn impose a thrust on bed 10 through hinge 23 which causes said bed to rotate about pin 13. The rotating of bed 10 about its hinged connection will obviously effectuate the unloading operation. It is important to note that the rear extremity of the lazy-tongs is universally jointed to permit rotation of bars 25 and 26 in a semi-horizontal plane as the handles 18 converge and rotation in a vertical plane by bars 25 and 26 as the bed rotates about pin 13. However, the front extremity of the tongs is limited to vertical displacement by hinge 23 to best utilize the thrust of the tongs to rotate bed 10 about its hinged connection. Thus it will be seen that by manually moving the handle bars 18 inwardly and toward each other the wheelbarrow bed 10 will be elevated at its rear to dump the load as shown by dotted lines in Figure 1. By manually moving the handle bars 18 away from each other and back to normal relative positions, the bed 10 will be returned to normal horizontal position. The linkage between the bed and handle bars may be of any suitable means whereby the lateral movement of the bars will raise or lower the rear end of the bed. In the drawings I show only a four bar lazy-tongs assembly. By adding additional bars obviously the extreme movements of the handle bars will be accordingly reduced.

Some changes may be made in the construction and arrangement of my means of unloading a wheelbarrow without departing from the real spirit and purpose of my invention, and it is my intention to cover by my claims, any modified forms of structure or use of mechanical equivalents which may be reasonably included within their scope.

I claim:

1. In a wheelbarrow, a trapezoidally-shaped frame having parallel major and minor bases, a bed hingedly secured to said frame, two supports extending forwardly and downwardly from the minor base of said frame, and a wheel rotatably mounted between the outward ends of said supports; two legs secured to the sides of said frame near its major base and extending in a downward direction; two spaced apart handles hingedly attached to the bottom side of said frame adjacent its minor base for rotation about a vertical axis toward or away from each other and projecting outside the major base of said frame, a universally jointed means secured to each of said handles at a point beyond the major base of said frame, a hinge secured to the bottom of said bed and positioned symmetrically between said handles at a point intermediate the minor base and major base of said frame, and extensible means suspended between and above said universal jointed means and said hinge to elevate one end of said bed when said handles are rotated towards each other.

2. In a wheelbarrow, a trapezoidally-shaped frame having parallel major and minor bases, a bed hingedly secured to said frame, two supports extending forwardly and downwardly from the minor base of said frame, and a wheel rotatably mounted between the outward ends of said supports; two legs secured to the sides of said frame near its major base and extending in a downward direction; two spaced apart handles hingedly attached to the bottom side of said frame adjacent its minor base for rotation about a vertical axis toward or away from each other and projecting outside the major base of said frame, a universally jointed means secured to each of said handles at a point beyond the major base of said frame, a hinge secured to the bottom of said bed and positioned symmetrically between said handles at a point intermediate the minor base and major base of said frame, and a plurality of hingedly connected bars suspended between and above said universal jointed means and said hinge to elevate one end of said bed when said handles are rotated towards each other.

3. In a wheelbarrow, a trapezoidally-shaped frame having parallel major and minor bases, a bed hingedly secured to said frame, two supports extending forwardly and downwardly from the minor base of said frame, and a wheel rotatably mounted between the outward ends of said supports; two legs secured to the sides of said frame near its major base and extending in a downward direction; two spaced apart handles hingedly attached to the bottom side of said frame adjacent its minor base for rotation about a vertical axis toward or away from each other and projecting outside the major base of said frame, a universally jointed means secured to each of said handles at a point beyond the major base of said frame, a hinge secured to the bottom of said bed and positioned symmetrically between said handles at a point intermediate the minor base and major base of said frame, a longer bar rotatably secured to each of said universal jointed means, said longer bars rotatably secured to each other at a point beyond their centers away from and above the said universal jointed means, a shorter bar rotatably secured to each longer bar, said shorter bars rotatably secured to each other and to said hinge, said longer bars and said shorter bars elevating one end of said bed when said handles are brought together.

References Cited in the file of this patent

UNITED STATES PATENTS

| | | |
|---|---|---|
| 465,904 | Wayman | Dec. 29, 1891 |
| 555,532 | Percy | Mar. 3, 1896 |
| 726,931 | Hull | May 5, 1903 |
| 1,402,050 | Cameron | Jan. 3, 1922 |
| 2,037,222 | Farrar | Apr. 14, 1936 |
| 2,660,446 | Edhardt | Nov. 24, 1953 |

FOREIGN PATENTS

| | | |
|---|---|---|
| 26,606 | Great Britain | Jan. 21, 1915 |